ent Number: 4,574,841
Date of Patent: Mar. 11, 1986

United States Patent [19]
Hügler

[54] ROCKER LEVER SOLENOID VALVE

[75] Inventor: Klaus Hügler, Schorndorf, Fed. Rep. of Germany

[73] Assignee: J. Lorch Gesellschaft & Co. KG, Waldenbuch, Fed. Rep. of Germany

[21] Appl. No.: 652,616

[22] Filed: Sep. 20, 1984

[30] Foreign Application Priority Data

Sep. 21, 1983 [DE] Fed. Rep. of Germany ....... 3334160

[51] Int. Cl.$^4$ ............................................. F16K 11/02
[52] U.S. Cl. .......................... 137/625.44; 137/596.17; 137/625.65; 251/65; 335/234
[58] Field of Search .............. 251/129, 137, 138, 141, 251/65; 335/78, 79, 234; 137/625.44, 625.65, 596.17, 870

[56] References Cited

U.S. PATENT DOCUMENTS

| | | | |
|---|---|---|---|
| 479,795 | 8/1892 | Fortier | 137/870 |
| 2,587,356 | 2/1952 | McPherson | 251/141 |
| 2,750,960 | 6/1956 | Hansen et al. | 137/870 |
| 3,203,447 | 8/1965 | Bremner et al. | 251/129 |
| 3,457,955 | 7/1969 | Kleiner et al. | 137/625.44 |
| 3,570,807 | 3/1971 | Sturman et al. | 251/65 |
| 3,683,962 | 8/1972 | Good | 137/870 |
| 4,343,329 | 8/1982 | Turansky et al. | 251/137 |

Primary Examiner—Samuel Scott
Assistant Examiner—Noah Kamen
Attorney, Agent, or Firm—Hopgood, Calimafde, Kalil, Blaustein & Judlowe

[57] ABSTRACT

A solenoid-operated pressure-fluid valve for reversible control of both supply and exhaust functions of a double-acting fluid-pressure device. A valve body has an inlet port communicating with an inlet chamber and an exhaust-outlet port communicating with an outlet chamber. The valve body has first and second control-port connections for connection to the respective control ports of the double-acting device, and each of these connections communicates with a valve seat in each of the chambers. A rocker arm is pivoted between the two chambers and carries two valve members in each of the two chambers. In one solenoid-actuated position of the rocker arm, valve-member action in the inlet chamber establishes inlet-chamber communication exclusively with one control-port connection while the valve-member action in the outlet chamber establishes outlet-chamber communication exclusively with the other control-port connection; in the other solenoid-actuated position, valve-member action in the respective chambers is such as to reverse the exclusivity of chamber communication with the respective control-port connections.

11 Claims, 1 Drawing Figure

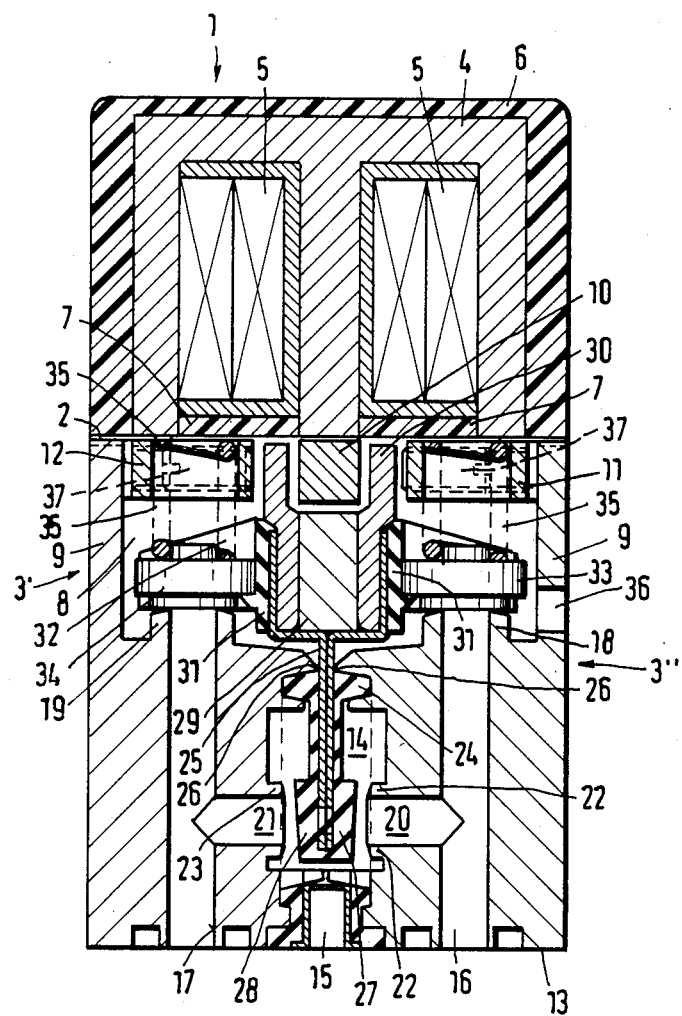

ROCKER LEVER SOLENOID VALVE

TECHNICAL FIELD

The invention relates to solenoid valves for liquid and gaseous fluids, having a rocker lever which can be moved by means of an electromagnet system and with which there is associated at least one valve closure piece by means of which at least one valve channel can be closed or throttled.

CROSS REFERENCE TO RELATED APPLICATION

Attention is directed to a related application filed of even date herewith by Klaus Hügler for a SOLENOID VALVE, Ser. No. 652,615, filed Sept. 20, 1984; the disclosure of which is incorporated herein by reference.

BACKGROUND OF THE INVENTION

Solenoid valves of the aforementioned type afford the advantage of small valve chambers into which extend valve channels. These chambers can be closed by valve closure pieces. The rocker lever is passed through the chamber seal in such a manner that its axis of rotation lies in or very close to that region of the seal which experiences elastic deformation upon a swinging of the rocker lever. In this way, the flexing and deforming work experienced by the seal can be kept to a minimum, which is advantageous with respect to the setting force required, as well as the energy required and the life of the seal. In the known valves of this type, however, the internal volume required is relatively large since the rocker lever is actuated by means of a solenoid which has a longitudinally displaceable ram, which, when the magnet system is energized, presses against the free end of the rocker lever and moves the latter out of its one end position into its other end position against the force of a pretensioned spring.

The object of the present invention is to provide a solenoid valve of the general type described above which has a greater field of use and, in particular, can be used as 4/3-valve or as 4/2-valve but nevertheless is of compact construction and can be switched with the least possible electrical switching power.

SUMMARY OF THE INVENTION

The advantages of the instant invention stem from its inventive construction. In particular, there is provided an electromagnet in magnetic proximity to a rotatable armature connected to a rocker arm. The armature includes a permanent magnet associated with two projecting members of the armature. The members are acted upon by the electromagnet to impart rotational motion to the rocker arm whereby the various flow channels of the valve are opened and closed.

The additional permanent-magnet system contributes to the compactness since, by means of this system, the armature can be held in the different switch positions when the electromagnet is de-energized, and thus the electromechanical efficiency is improved. The electromagnet system can therefore be made smaller. Another advantage of the valve in accordance with the invention is that it can be switched by means of continuous signals and also by means of pulse signals. Furthermore, the permanent-magnet system simplifies imparting to the valve a monostable, bistable or tristable behavior. The additional valve closure pieces are movable by the arm, which in turn, is formed at least in part by the armature.

The rotating armature is coupled with the rocker arm and the valve channels are connected so that they may be closed by means of the two additional valve closure pieces. The first and second valve channels respectively and the discharge of one additional channel each extend into the two spaces containing the first and second valve pieces or the third and fourth valve pieces. In this way, there can be obtained in an extremely compact construction, a 4/3-valve or 4/2-valve such as is advantageous, for instance, for controlling a pneumatic cylinder. This construction makes it possible for moments of rotation on the armature-rocker-lever system due to pressure and flow to counteract each other and thus, at least in part, do away with their net effect of impeding the setting movement.

All valve closure pieces need not be capable of being applied directly to the valve seat but may, in turn, actuate valve disks, valve balls, valve plungers or the like. It is, of course, also possible to hold this system stationary and develop the core or valve-housing parts movable with respect to it instead of moving the armature system. The armature can also carry out a linear movement and move the rocker lever, for instance, via a driver.

One embodiment of the invention has the features set forth in claim 2, since such a construction of the magnet system leads to minimum need for excitation and thus takes up minimum space. Furthermore, an E-shaped core or M-shaped is advantageous for the electromagnet system for reasons of manufacture, since the exciter coil or coils can be inserted ready-wound into the core and the core can also be of laminated construction.

The features claimed in claims 3 and 4 also contribute to a compact construction. The arrangement of the permanent magnet outside of the magnetic closure of the electromagnet system which is closed via the armature reduces the exciter power of the electromagnet system. The arrangement of the permanent magnet between two pole shoe bodies whose end sections protrude beyond the permanent magnet and form the armature also results in a compact construction and reduces the magnetic resistance in the magnetic circuit of the permanent magnet to a minimum. Here again, the dimensions of the permanent magnet are also minimized.

Since the symmetrical development of the electromagent system, the permanent magnet system and valve body according to claim 5 contributes to minimizing the number of different structural parts, a cost-favorable construction is obtained.

In a construction, according to the invention, the arrangement and connection of the valve closure pieces which are associated with the third and fourth valve channels can be selected in accordance with claim 6, since in this way the additional space required for valve closure pieces and the extra weight can be kept small. This is true in particular when, in accordance with claim 7, the supporting parts which hold these valve closure pieces are on a plastic body which surrounds the permanent magnet and the sections of the two pole shoe members which rest against it. This contributes to minimizing the masses and hence the inertia to be moved upon a switching process.

The valve closure pieces associated with the third and fourth valve channels can, in accordance with claim 8, be acted on by a spring in order to maintain the third and fourth valve channels closed in a central position of the rocker lever. Accordingly, it is advantageous to develop the magnetic valve in accordance with claim 9.

In order to adjust the operating air gaps, adjustment screws can be provided as recited in claim 11. It is then no longer necessary to make such high demands on the tolerances of the individual construction parts as would be necessary without the possibility of adjustment. Due to the possibility of simultaneously opening or closing several valve cross sections in the central position of the armatue-rocker-lever system, valves are free of overlap and three-way valves can be easily produced.

Furthermore, transverse bores can be provided in the end sections of the two outer legs in order for each to receive a spring. These springs, whose initial tension is adjustable preferably by means of a screw, can rest continuously against one or the other of the two legs forming the armature and in this way, they hold the armature in the central position or impart to the valve a proportional behavior. The arrangement can also be such, however, that the springs act on the armature only in the one or the other end position in order to reduce the holding force produced by the permanent-magnet system.

BRIEF DESCRIPTION OF THE DRAWING

The invention will be described in detail below with reference to the drawing which illustrates only a specific embodiment in which:

FIG. 1 is a longitudinal section through a solenoid valve constructed in accordance with the instant invention.

DETAILED DESCRIPTION

A solenoid valve which can be used to control a pneumatic cylinder has a magnet head 1 which lies, with the interposition of a separating foil 2, with one side against the valve housing 3 which consists of the two halves 3' and 3". Screws (not shown) connect these two halves together as well as the valve housing 3 to the magnet head 1; which is protected by the separating foil 2 from the admission of the fluid which the solenoid valve is designed to direct to its various channels.

The magnet head 1 contains a laminated E-shaped core 4 into which two coaxially arranged exciter coils 5 wound outside the core are inserted. The electromagnet could have only a single exciter coil. The core 4 is located in a plastic housing 6 which leaves free only those end surfaces of the two outer legs as well as of the central leg of the core 4 which rest against the separating foil 2. The space between these legs and the separating foil and the space between these legs and the exciter coils 5 is filled with an insulating compound 7. Plastic housing 6 and insulating compound 7 may also be formed from a single molded block.

As shown in the figure, the valve housing 3 is provided on the side resting against the separating foil 2 with a depression the depth of which is about 40% of the dimension of the valve housing measured in that direction. On the outside, this depression, which forms the first space or outlet chamber 8, is limited by a wall 9 of the valve housing which is directed towards the wall which abuts the plastic housing 6 and terminates flush with the outside thereof.

For providing three magnet poles 10, 11 and 12 of the electromagnet which are present in the first space, three solid strips of a material of good electric magnetizability are fastened in the valve housing 3 against the wall 9 so that their one side rests with its full surface against the separating foil 2. The strip forming the central magnet pole 10 is of square cross section. As shown in the figure, it is adapted to the dimensions of the central leg of the core 4 and therefore forms an extension of the central leg equal in cross section to the latter. In the same way, the strips forming the two outer magnet poles 11 and 12, which are also solid and consist of a readily magnetizable material, extend the length of the two outer legs. These strips, however, are of rectangular cross section, so that, while they terminate flush on the outside with the associated lateral legs, they extend towards the central magnet pole 10 beyond the outer legs of the core.

Between the first space 8 and the outer side 13 of the valve housing 3 facing away from the separating foil 2 there is provided, centrally, a second space or inlet chamber 14 into which an inlet port 15 entering from the outer side 13 discharges. On both sides of this centrally arranged inlet port 15, two valve bores or ports 16 and 17 parallel to the inlet port 15 pass through the valve housing 3, each at an equal distance from inlet port 15. Each of these valve bores 16 and 17 which commence on the outer side 13 discharges into a separate cylindrical part of material which protrudes into the first space 8. The material forms a valve seat 18 and 19 respectively. From the two valve bores 16 and 17 there extend at right angles to the longitudinal axis of the latter in each case valve bores 20 and 21 respectively towards second space 14 into which they discharge, each in the center of a pair of valve seats 22 and 23 respectively extending into said space. The two coaxially arranged valve bores 20 and 21 form first and second valve channels and the two valve bores 16 and 17 form third and fourth valve channels.

The separating wall between the first space 8 and the second space 14 is formed by two parts of the centrally divided valve housing 3 which protrude towards each other but terminate at a distance from each other defining a space therebetween. In each of the end faces, facing each other, of these material parts which protrude towards each other there is provided an annular trapezoidal groove. A ring seal 24 of double-trapezoidal cross section which engages into these two trapezoidal grooves seals the first space 8 off from the second space 14 but also receives a metal strip 25 which is mounted directly alongside the sealing member 24 on two knife-edges 26 facing each other on the side facing the first space 8. The knife edges are formed by the two parts of valve housing 3 and form a swing bearing for a double arm rocker lever. The strip 25 extends into the second space 14 and lies within a plastic body which is formed integral on the sealing member 24 and integral on the free end section of slightly trapezoidal cross section. This end section of trapezoidal cross section forms two valve members or closure pieces 27 and 28 by means of which the valve seats 22 and 23 respectively and therefore the first and second valve channels can be closed.

The strip 25, which is divided in longitudinal direction, also extends into the first space 8. Its two halves are bent outward at a right angle at a slight distance from the separating wall and then bent again in opposite direction at a right angle so as to form a U-shaped element for receiving a permanent magnet 29 of rectangular cross section and two pole-shoe bodies 30. Pole bodies 30 are developed as mirror images of each other and rest directly on the opposite side surfaces of the permanent magnet 29, but extend beyond the permanent magnet 29 towards the separating foil 2. Pole-shoe bodies 30 and the central pole 10 define air gaps of sufficient size. The U-shaped receiver which is formed by the strip 25 of a non-magnetizable metal is surrounded by a plastic body 31 and pressed against the pole-shoe members 30 so that the latter are firmly connected to the strip 25. The part of the strip 25 extending from the knife edges 26 towards the separating foil 2, the permanent magnet 29, the two pole-shoe members 30 and the plastic member 31 therefore form one arm of the double-armed rocker lever whose free end has a forked shape. The other arm of the double-armed rocker lever is formed by the part of the strip 25 extending into the second space 14 and the covering of strip 25.

The two pole shoe members 30 which protrude beyond the permanent magnet 29 engage, between the magnet poles 10 and 11 and 10 and 12 respectively, with the formation in each case of two working air gaps. By the symmetrical construction and arrangement both of the magnet poles 10 to 12 and of the pole shoe members 30 assurance is had that the sections of the pole shoe members 30 which extend into the operating air gaps rest in the two end positions of the double-armed rocker lever. That is, against one of the two outer magnet poles and the central magnet pole respectively. By the formation of a total of four operating air gaps assurance is had that the sum of the operating air gaps both for the magnetic flux of the electromagnet and for the magnetic flux of the permanent magnet which lies outside the magnetic circuit of the electromagnet remains constant upon movement of the armature.

At opposite places of the plastic member 31 there are provided diametrically protruding holders 32 into each of which there is inserted a valve member or closure piece 33 and 34 respectively. The valve closure piece 33 is aligned with the valve bore 16 and the valve closure piece 34 with the valve bore 17. The arrangement of the valve closure pieces 33 and 34 in their holders is so selected that—as shown in the figure—these valve closure pieces close the associated valve bore when the rocker lever is in the central position shown. In each case a pretensioned coil spring 35 rests against the side of the valve closure piece pointing towards the separating foil 2 and engages with its other end into a bore in the magnet poles 11 and 12 respectively and are axially aligned with the valve closure piece. Depending on the direction of swing (left or right in the Figure) of the rocker lever, one valve bore is opened while the other remains closed when the rocker lever swings into its end position.

A borehole 36 which passes through the wall 19 opens into the first space 8. Furthermore, in the embodiment shown by way of example only the two outer magnet poles 11 and 12 are each provided with a continuous threaded transverse bore within each of which there is guided a respective screw 37 of readily magnetizable material which is accessible from the outside. By means of screws 37 the effective size of the operating air gaps can be adjusted. Parallel to the screws 37 there is provided in the two outer magnet poles 11 and 12 additional boreholes (not shown) into each of which one end of a coil spring engages. The other end of these springs rests against one or the other pole-shoe body 30. The initial tension of these coil springs is preferably adjustable by means of a screw which is guided in the borehole of the magnet poles. Insofar as these springs are intended merely to reduce the break-loose force which must be applied in order to remove the pole-shoe members 30 from the magnet poles, the springs can also lie within the bores and merely actuate a push pin from which the pole-shoe member lifts off as soon as the separation from the magnet pole is complete.

In the event of the development of the valve as a 4/2-valve, the permanent magnet system holds the double-arm rocker lever in its one or other end position. In either end position the two pole-shoe members 30 rest against the magnet poles 10 and 11 or against the magnet poles 10 and 12. In this way either the valve bores 16 and 21 or the valve bores 17 and 20 are closed. Switching can be effected by a pulse-like excitation of the exciter coils 5 because the magnetic flux of the electromagnet superimposes itself on the flux of the permanent magnet by addition in the operating air gaps which are to be reduced in size upon rotation and in the sense of a subtraction in the operating air gaps which are to be increased in size upon rotation.

If a pneumatic cylinder is to be controlled by the valve described above, then the valve bore 16 is a first control port, connected with the one pneumatic connection and the valve bore 17 is a second central port, connected with another pneumatic connection. The valve bore 15 is the inlet port, connected to the source of pressure. The bore-hole 36 forms the exhaust port.

While one embodiment of the inventive solenoid valve has been described in detail with reference to the drawings, various modifications will be obvious to those with ordinary skill in the art. Such modifications are within the spirit and scope of the instant invention which is limited and defined only by the appended claims.

I claim:

1. A solenoid-operated pressure-fluid valve for reversible control of both supply and exhaust functions of a double-acting fluid-pressure device, said valve comprising a valve body having an inlet port communicating with an inlet chamber and an exhaust outlet port communicating with an outlet chamber, said chambers having a communicating passage therebetween, a rocker arm fulcrummed in said communicating passage and flexibly sealed therein to preclude fluid flow in said communicating passage, said body having first and second control-port connections for connection to the respective control ports of the double-acting device, first and second valve-seat formations in the respective chambers in one direction of lateral offset from said rocker arm and communicating with said first control port, third and fourth valve-seat formations in the respective chambers in the opposite direction of lateral offset from said rocker arm, and communicating with said second control port, a first pair of valve members carried by said arm within the inlet chamber and positioned to coact with the respective valve seats in the inlet chamber in accordance with rocker-arm pivotal position, a second pair of valve members carried by said arm within the outlet chamber and positioned to coact with the respective valve seats in the outlet chamber in accordance with rocker-arm pivotal position; said first control port being open to said inlet chamber and closed to said outlet chamber for one rocker-arm pivoted position, while said second control port is closed to said inlet chamber and open to said outlet chamber for said one rocker-arm position; said first control port being closed to said inlet chamber and open to said outlet chamber for a second rocker-arm pivoted position, while said second control port is open to said inlet chamber and closed to said outlet chamber for said second rocker-arm pivoted position; and means including a solenoid actuator for actuating said rocker arm from one to the other of its said positions.

2. The valve of claim 1, in which an armature element is carried at one end of said rocker arm, said armature element including a permanent magnet with two spaced arms defining opposed poles across an air gap therebetween, and in which said solenoid actuator comprises an electromagnet mounted to said body; said electromagnet comprising a three-leg core positioned to receive one armature arm between the center core leg and one of the outer core legs and to receive the other armature arm between the center core leg and the other of the outer core legs, the positioning and proportioning of core legs and armature arms being such that four air gaps are established between the respective adjacent faces of said core legs and said armature arms, and an excitation winding coupled to said center leg.

3. The valve of claim 2, wherein said armature element is a U-shaped assembly of two like arms of magnetic-flux-conducting material assembled to oppositely polarized faces of a permanent magnet of rectangular section.

4. The valve of claim 2, wherein said three-leg core is of E or M configuration.

5. The valve of claim 2, characterized by the fact that at least in one of the two outer core legs of the electromagnet there is provided a continuous threaded borehole which extends into the adjoining operating air gap and in which an adjustment screw of magnetizable material is arranged.

6. The valve of claim 1, characterized by the fact that said rocker arm is pivoted on an axis in the central plane of symmetry of said valve body, and that both inlet and outlet chambers are symmetrically divided by the central plane, with the inlet-chamber valve seats and the outlet-chamber valve seats being symmetrically disposed on opposite sides of the central plane.

7. The valve of claim 6, in which said solenoid actuator is configured and positioned symmetrically on opposite sides of the central plane.

8. The valve of claim 1, characterized by the fact that the valve members carried by the rocker arm in the exhaust-outlet chamber are carried by supporting brackets which extend in symmetrically opposite offsets from the central plane of symmetry of the rocker arm.

9. The valve of claim 8, in which said supporting brackets are elements of a single piece of plastic material in assembled relation to that port of the rocker arm which extends into the outlet chamber.

10. The valve of claim 8, in which each of said valve members in the exhaust chamber is independently urged in the direction of its valve-seating position, one of said brackets being operative in one solenoid-actuated position of the rocker arm to unseat one of the outlet-chamber valve members, and the other of said brackets being operative in the other solenoid-actuated position of the rocker arm to unseat the other of the outlet-chamber valve members.

11. The valve of claim 2, characterized by the fact that the sum of the operating air gaps is a constant which is independent of the position of the armature element.

* * * * *